United States Patent
Hyun et al.

(10) Patent No.: US 10,880,770 B2
(45) Date of Patent: Dec. 29, 2020

(54) METHOD AND APPARATUS FOR MANAGING QUALITY OF WIRELESS LAN

(71) Applicant: KT Corporation, Seongnam-si (KR)

(72) Inventors: In Jae Hyun, Seoul (KR); Jang Won Lee, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 16/306,204

(22) PCT Filed: May 26, 2017

(86) PCT No.: PCT/KR2017/005551
§ 371 (c)(1),
(2) Date: Nov. 30, 2018

(87) PCT Pub. No.: WO2017/209462
PCT Pub. Date: Dec. 7, 2017

(65) Prior Publication Data
US 2019/0297517 A1    Sep. 26, 2019

(30) Foreign Application Priority Data

Jun. 3, 2016  (KR) .................... 10-2016-0069328

(51) Int. Cl.
*H04B 7/00*    (2006.01)
*H04W 24/10*    (2009.01)
(Continued)

(52) U.S. Cl.
CPC .......... *H04W 24/10* (2013.01); *H04W 24/08* (2013.01); *H04W 84/12* (2013.01)

(58) Field of Classification Search
CPC .... H04W 76/02; H04W 76/028; H04W 24/08
(Continued)

(56) References Cited

U.S. PATENT DOCUMENTS 8,098,590 B2 * 1/2012 Catovic ................. H04W 24/08
                                              370/252
8,155,081 B1 * 4/2012 Mater ................... H04W 48/20
                                              370/331
(Continued)

FOREIGN PATENT DOCUMENTS

KR    10-2007-0021098 A    2/2007
KR    10-2007-0080353 A    8/2007
(Continued)

OTHER PUBLICATIONS

International Search Report for PCT/KR2017/005551, dated Aug. 29, 2017.

*Primary Examiner* — Dmitry Levitan
(74) *Attorney, Agent, or Firm* — Sughrue Mion, PLLC

(57) ABSTRACT

The present invention relates to a method of managing quality of a wireless LAN. According to one aspect of the present invention, the method of managing the quality of the wireless LAN includes: obtaining basic performance measurement information on a terminal that accesses the wireless LAN and first performance measurement information; determining second performance measurement information to be compared with the first performance measurement information, by using the basic performance measurement information; generating quality assessment information for the first performance measurement information on the basis of the first performance measurement information and the second performance measurement information; and transmitting the quality assessment information to the terminal.

9 Claims, 4 Drawing Sheets

(51) Int. Cl.
*H04W 24/08* (2009.01)
*H04W 84/12* (2009.01)

(58) Field of Classification Search
USPC .................................. 370/310, 328, 329, 253
See application file for complete search history.

(56) References Cited

U.S. PATENT DOCUMENTS

| | | | |
|---|---|---|---|
| 9,998,184 B2* | 6/2018 | Kasher | H04B 7/043 |
| 2004/0266442 A1* | 12/2004 | Flanagan | H04L 41/5025 |
| | | | 455/445 |
| 2009/0310501 A1 | 12/2009 | Catovic et al. | |
| 2015/0072626 A1* | 3/2015 | Shitara | H03H 7/40 |
| | | | 455/77 |
| 2017/0150371 A1* | 5/2017 | Cichonski | H04B 17/318 |

FOREIGN PATENT DOCUMENTS

| | | |
|---|---|---|
| KR | 10-2009-0062468 A | 6/2009 |
| KR | 10-2010-0039906 A | 4/2010 |

* cited by examiner

US 10,880,770 B2

METHOD AND APPARATUS FOR MANAGING QUALITY OF WIRELESS LAN

TECHNICAL FIELD

The present invention relates generally to a wireless LAN system. More particularly, the present invention relate to a method, apparatus, and software for managing quality of a wireless LAN, and a recording medium on which the software is stored.

BACKGROUND ART

Recently, as the number of devices, such as smart phones, supporting a wireless LAN (WLAN) and consumption of high capacity content increases, user demand for improvement of quality of the wireless LAN increases. In order to improve performance of the wireless LAN, solutions such as increasing a system bandwidth, improving peak data rate, and so on, have been proposed. Further, high-efficiency wireless LAN standards are under discussion to support simultaneous access of a substantial number of terminals in an environment where multiple access points (APs) are densely populated and AP coverages overlap each other to improve performance for the users who require services with high capacity and high rate.

Even though such wireless LAN technology have been developed, in the situation of ordinary users, it is impossible to know whether the quality of the wireless LAN service that is currently provided to the users is appropriate or not with respect to the quality providable by a device or a surrounding environment, which is inconvenient. For example, conventional wireless LAN performance measurement merely informs the users of upload speed, download speed, and latency which are the results of transmitting and receiving test packets between a wireless LAN device and a server for measuring the performance of the network. These results of measuring the performance varies according to the environment in which the performance measurement is performed, so that most ordinary users are unable to easily understand the meaning of the results of the measuring the performance. Also, in the position of the ordinary users, it is impossible to know a method of modifying setting to improve the quality of the wireless LAN, so that the users continue to experience inadequate quality of the wireless LAN.

DISCLOSURE

Technical Problem

The present invention is intended to propose a method of managing quality of a wireless LAN, the method including provision of wireless LAN quality assessment and modification setting information.

It is to be understood that technical problems to be solved by the present invention are not limited to the aforementioned technical problems and other technical problems which are not mentioned will be apparent from the following description to a person with an ordinary skill in the art to which the present invention pertains.

Technical Solution

According to one aspect of the present invention, there is provided a method of managing quality of a wireless LAN, the method including: obtaining basic performance measurement information on a terminal that accesses the wireless LAN and first performance measurement information; determining second performance measurement information to be compared with the first performance measurement information, by using the basic performance measurement information; generating quality assessment information for the first performance measurement information on the basis of the first performance measurement information and the second performance measurement information; and transmitting the quality assessment information to the terminal.

According to another aspect of the present invention, there is provided a method of assessing quality of a wireless LAN, the method including: obtaining first basic performance measurement information and first performance measurement information; linking the first basic performance measurement information and the first performance measurement information for storage; obtaining second basic performance measurement information and second performance measurement information; linking the second basic performance measurement information and the second performance measurement information for storage; and generating quality assessment information for a terminal that accesses the wireless LAN by comparing the first performance measurement information with the second performance measurement information.

According to still another aspect of the present invention, there is provided an apparatus for managing quality of a wireless LAN, the apparatus including: a processor; a transceiver; and a memory. The processor is configured to: obtain basic performance measurement information on a terminal that accesses the wireless LAN and first performance measurement information via the transceiver; determine second performance measurement information to be compared with the first performance measurement information, by using the basic performance measurement information; generate quality assessment information for the first performance measurement information on the basis of the first performance measurement information and the second performance measurement information; and transmit the quality assessment information to the terminal via the transceiver.

According to yet still another aspect of the present invention, there is provided an apparatus for assessing quality of a wireless LAN, the apparatus including: a processor; a transceiver; and a memory. The processor is configured to: obtain first basic performance measurement information and first performance measurement information via the transceiver; link the first basic performance measurement information and the first performance measurement information for storage in the memory; obtain second basic performance measurement information and second performance measurement information via the transceiver; link the second basic performance measurement information and the second performance measurement information for storage in the memory; and generate quality assessment information for a terminal that accesses the wireless LAN by comparing the first performance measurement information with the second performance measurement information.

In the various aspects of the present invention, the determining of the second performance measurement information may include: determining whether basic performance measurement information corresponding to the obtained basic performance measurement information is present in existing basic performance measurement information stored in a database.

When determining that the basic performance measurement information corresponding to the obtained basic performance measurement information is present, the determining of the second performance measurement information may further include: obtaining the second performance measurement information linked to the corresponding basic measurement information from the database.

When determining that the basic performance measurement information corresponding to the obtained basic performance measurement information is not present, the determining of the second performance measurement information may further include: generating the second performance measurement information using a pre-defined statistical model.

When determining that the basic performance measurement information corresponding to the obtained basic performance measurement information is not present, the quality assessment information for the first performance measurement information may be generated on the basis of the first performance measurement information and the second performance measurement information generated using the pre-defined statistical model.

The generating of the quality assessment information may include: determining whether to apply statistical processing for the second performance measurement information obtained from the database.

Whether to apply the statistical processing may be determined on the basis of whether the number of items of the second performance measurement information obtained from the database is less than or equal to or greater than a predetermined threshold value.

When determining that the statistical processing for the second performance measurement information obtained from the database is applied, the quality assessment information for the first performance measurement information may be generated on the basis of the first performance measurement information and the second performance measurement information obtained from the database.

When determining that the statistical processing for the second performance measurement information obtained from the database is not applied, the quality assessment information for the first performance measurement information may be generated on the basis of the first performance measurement information and the second performance measurement information generated using a pre-defined statistical model.

The quality assessment information may be transmitted with modification setting information generated on the basis of the quality assessment information to the terminal.

The method may further include: storing the obtained basic performance measurement information and the first performance measurement information.

It is to be understood that the foregoing summarized features are exemplary aspects of the following detailed description of the present invention without limiting the scope of the present invention.

Advantageous Effects

According to the present invention, a method and apparatus for assessing and managing the quality of the wireless LAN is provided, in which wireless LAN quality assessment information that terminal configuration information, terminal nearby environment information, information on a network that the terminal accesses, and the like are considered overall is provided in the form that the user is able to easily understand and the setting information for improving the assessment of the quality of the wireless LAN is further provided.

Effects that may be obtained from the present invention will not be limited to only the above described effects. In addition, other effects which are not described herein will become apparent to those skilled in the art from the following description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

MODE FOR INVENTION

Figure 1:
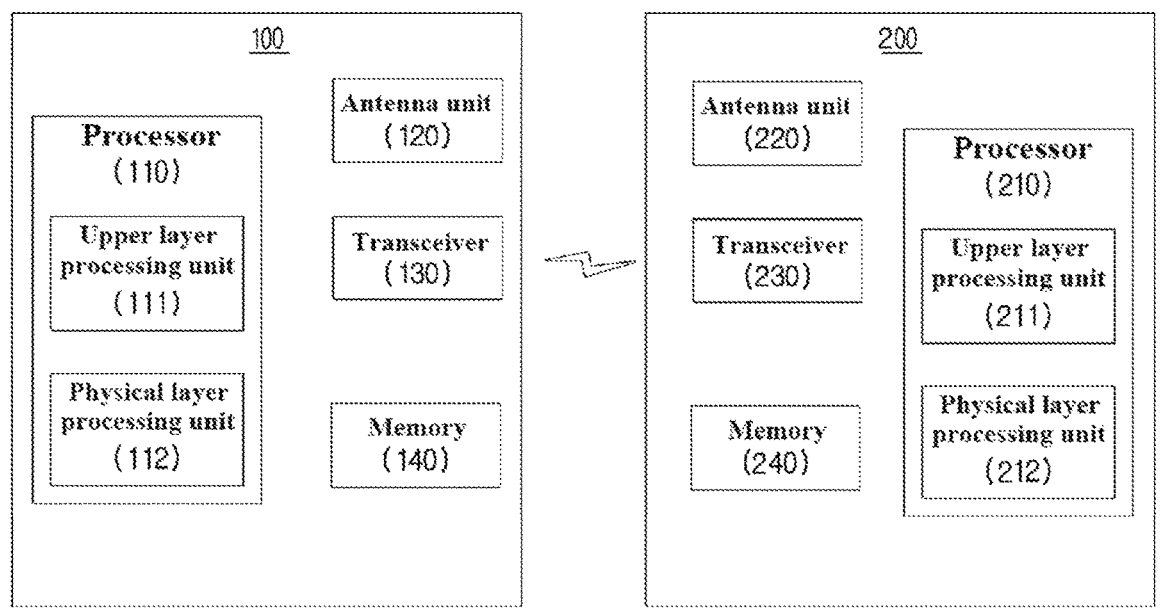
FIG. 1 is a diagram illustrating a configuration of wireless devices according to the present invention.

Hereinbelow, exemplary embodiments of the present invention will be described in detail with reference to the accompanying drawings such that the present invention can be easily embodied by those skilled in the art to which this present invention belongs. However, the present invention may be embodied in various different forms and should not be limited to the embodiments set forth herein. Further, in order to clearly explain the present disclosure, portions that are not related to the present disclosure are omitted in the drawings, and like reference numerals designate like elements throughout the specification.

It will be understood that when an element is referred to as being "coupled" or "connected" to another element, it can be directly coupled or connected to the other element or intervening elements may be present therebetween. In contrast, it will be understood that when an element is referred to as being "directly coupled" or "directly connected" to another element, there are no intervening elements present.

Throughout the specification, a station (STA) means an arbitrary function medium including a physical layer interface for medium access control (MAC) and a wireless medium. The stations (STAs) may be divided into a station (STA) which is an access point (AP) and a station (STA) which is a non-access point (non-AP). The station (STA) which is the access point (AP) may be referred to simply as an access point (AP), and the station (STA) which is the non-access point (non-AP) may be referred to simply as a terminal.

The access point (AP) may refer to a centralized controller, a base station (BS), a node-B, an e-node-B, a base transceiver system (BTS), a site controller, or the like, and may include partial or all functions thereof.

The terminal may refer to a wireless transmit/receive unit (WTRU), user equipment (UE), a user terminal (UT), an access terminal (AT), a mobile station (MS), a mobile terminal, a subscriber unit, a subscriber station (SS), a wireless device, a mobile subscriber unit, or the like, and may include partial or all functions thereof.

Here, examples of the terminal include a communication-enabled desktop computer, a laptop computer, a tablet PC, a wireless phone, a mobile phone, a smart phone, an e-book reader, a portable multimedia player (PMP), a handheld game console, a navigation device, a digital camera, a digital multimedia broadcasting (DMB) player, a digital audio recorder, a digital audio player, a digital picture recorder, a digital picture player, a digital video recorder, a digital video player, and the like.

FIG. 1 is a diagram illustrating a configuration of wireless devices according to the present invention.

FIG. 1 illustrates a terminal apparatus 100 and a network apparatus 200.

The terminal apparatus 100 may include a processor 110, an antenna unit 120, a transceiver 130, and a memory 140.

The processor 110 performs baseband-related signal processing and may include an upper layer processing unit 111 and a physical layer processing unit 112. The upper layer processing unit 111 may process operation of the medium access control (MAC) layer or higher layers. The physical layer processing unit 112 may process operation of the physical (PHY) layer (for example, uplink transmission signal processing and downlink reception signal processing). In addition to performing baseband-related signal processing, the processor 110 may control overall operation of the terminal apparatus 100.

The antenna unit 120 may include one or more physical antennas, and may support MIMO transmission and reception when including multiple antennas. The transceiver 130 may include a radio frequency (RF) transmitter and an RF receiver. The memory 140 may store information processed by the processor 110, software related to operation of the terminal apparatus 100, an operating system, applications, and the like, and may include constituents, such as a buffer, and the like.

The network apparatus 200 may include a processor 210, an antenna unit 220, a transceiver 230, and a memory 240.

The processor 210 performs baseband-related signal processing and may include an upper layer processing unit 211 and a physical layer processing unit 212. The upper layer processing unit 211 may process operation of the MAC layer or higher layers. The physical layer processing unit 212 may process operation of the PHY layer (for example, downlink transmission signal processing and uplink reception signal processing). In addition to performing baseband-related signal processing, the processor 210 may control overall operation of the network apparatus 200.

The antenna unit 220 may include one or more physical antennas, and may support MIMO transmission and reception when including multiple antennas. The transceiver 230 may include an RF transmitter and an RF receiver. The memory 240 may store information processed by the processor 210, software related to operation of the base station apparatus 200, an operating system, applications, and the like, and may include constituents, such as a buffer, and the like.

Figure 2:
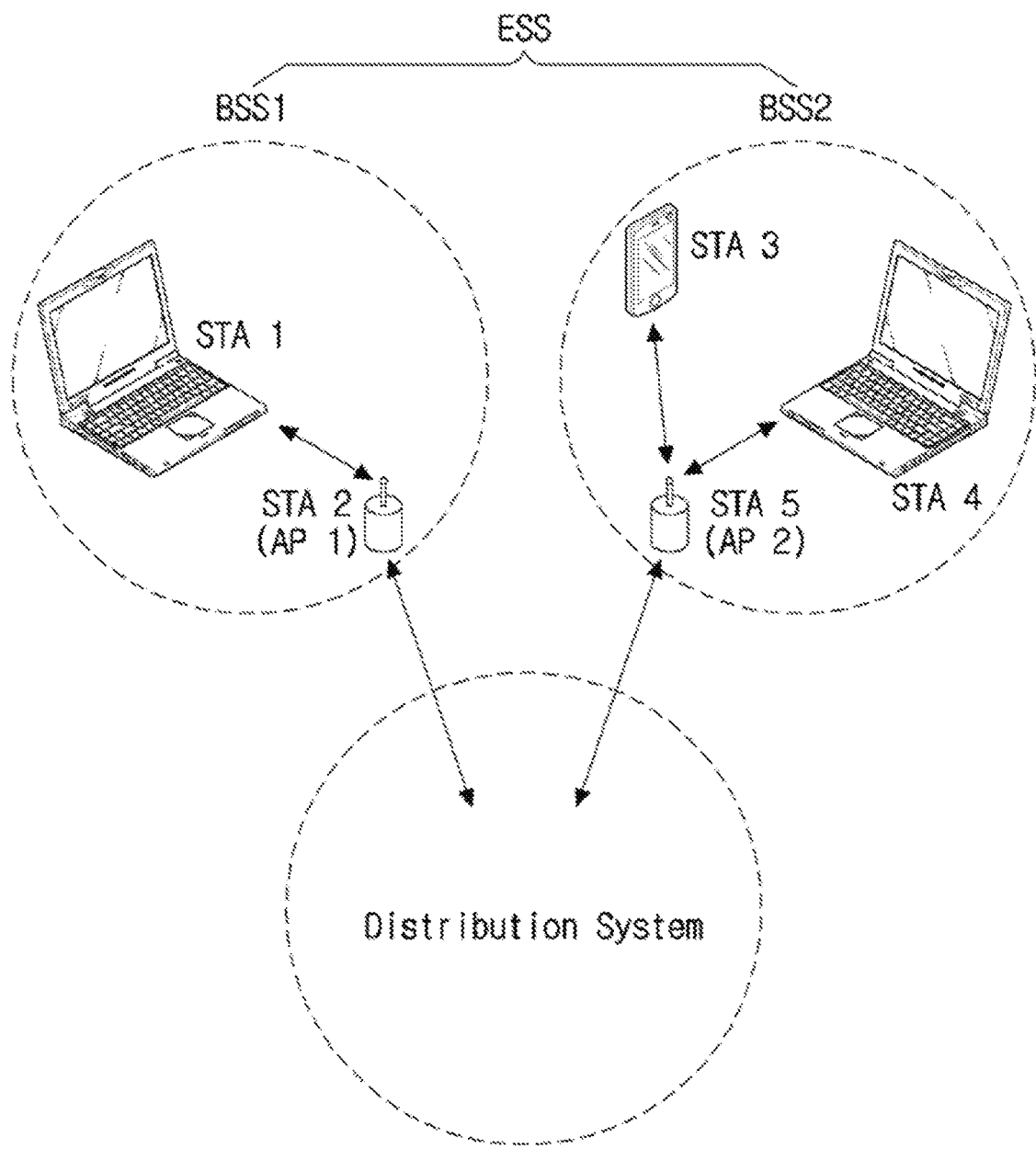
FIG. 2 is a schematic diagram illustrating an example of a configuration of a WLAN system.

FIG. 2 is a schematic diagram illustrating an example of a configuration of a WLAN system.

Referring to FIG. 2, the WLAN system includes at least one basic service set (BSS). The BSS means a set of stations (STA 1, STA 2 (AP 1), STA 3, STA 4, and STA 5 (AP 2)) capable of communicating with each other by being successfully synchronized, and is not the concept that means a specific area.

The BSSs may be divided into an infrastructure BSS and an independent BSS (IBSS), and a BSS 1 and a BSS 2 mean infrastructure BSSs. The BSS 1 may include a terminal (STA 1), an access point (STA 2 (AP 1)) providing distribution service, and a distribution system (DS) connecting multiple access points (STA 2 (AP 1) and STA 5 (AP 2)). In the BSS 1, the access point (STA 2 (AP 1)) manages the terminal (STA 1).

The BSS 2 may include terminals (STA 3 and STA 4), an access point (STA 5 (AP 2)) providing distribution service, and a distribution system connecting multiple access points (STA 2 (AP 1) and STA 5(AP 2)). In the BSS 2, the access point (STA 5 (AP 2)) manages the terminals (STA 3 and STA 4).

In the meantime, the independent BSS is a BSS that operates in an ad-hoc mode. The IBSS does not include the access point, so that a centralized management entity is not also present. That is, in the IBSS, terminals are managed in a distributed manner. In the IBSS, all the terminals may be mobile terminals. Access to the distribution system DS is not allowed, so that a self-contained network is established.

The access points (STA 2 (AP 1) and STA 5 (AP 2)) provide, for the terminals (STA 1, STA 3, and STA 4) connected thereto, access to the distribution system (DS) over the wireless medium. In the BSS 1 or BSS 2, communication between the terminals (STA 1, STA 3, and STA 4) is generally performed via the access points (STA 2 (AP 1) and STA 5 (AP 2)), but when direct links are set, direct communication between the terminals (STA 1, STA 3, and STA 4) is possible.

The multiple infrastructure BSSs may be connected to each other via the distribution system (DS). The multiple BBSs connected to each other via the distribution system (DS) are referred to as an extended service set (ESS). The stations included in the ESS are capable of communicating with each other, and the terminal may move from one BSS to another BSS within the same ESS with seamless communication.

The distribution system (DS) is a mechanism for communication between one access point and another access point. According to this, the access point may transmit frames for the terminals connected to the BSS that is managed by the access point, or may transmit frames for an arbitrary terminal moved to another BSS. Also, the access point may transmit or receive frames from an external network, such as a wired network, or the like. This distribution system (DS) is not necessarily a network, and there is no limitation to the form. For example, the distribution system may be a wireless network, such as a mesh network, or may be a physical structure connecting access points to each other.

In the infrastructure BSS, in order for the terminal (STA) to transmit and receive data, first, the terminal (STA) is required to be connected to the access point (AP). The process of connecting the terminal to the access point may include the process of searching for the access point. The terminal may search for the access point by a passive scanning method that beacons are received from nearby access points, or by an active scanning method that probe request frames are transmitted to nearby access points and in response thereto, probe response frames are received. Through this, the terminal may obtain basic information of the access point (for example, a service set ID (SSID) of the access point and a medium access control (MAC) address), and may determine received signal strength (RSS) from the AP, and so on. After the searching process, an authentication process and an association process are performed, whereby the process of connecting the terminal to the access point is performed.

Hereinafter, the method of managing the quality of the wireless LAN according to the embodiments of the present invention will be described. The managing of the quality of the wireless LAN may include assessing the quality of the wireless LAN, and providing setting information or control information for improving or adjusting the quality of the wireless LAN on the basis of the result of the assessment (namely, quality assessment information).

Figure 3:
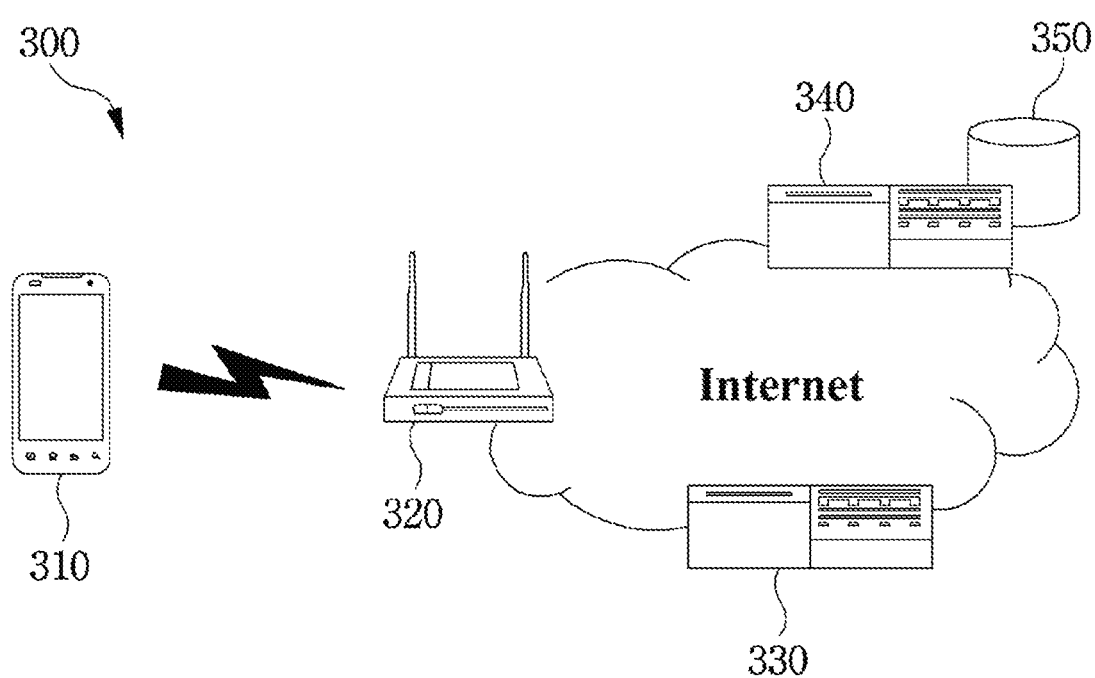
FIG. 3 is a diagram conceptually illustrating a configuration of a system for managing quality of a wireless LAN according to an embodiment of the present invention.

FIG. 3 is a diagram conceptually illustrating a configuration of a system for managing quality of a wireless LAN according to an embodiment of the present invention.

The system 300 for managing the quality of the wireless LA may include a terminal 310, an AP 320, a performance measurement server 330, a quality assessment server 340, and a database (DB) 350.

The terminal 310 and the AP 320 may constitute the wireless LAN (for example, the infrastructure BSS), and the AP 320 may provide connection to the external network (for example, the Internet) for the terminal 310.

The performance measurement server 330 may perform measurement of the network performance provided to the terminal 310. For example, the performance measurement server 330 may perform measurement of the performance by transmitting and receiving performance measurement packets from the terminal 310. The performance measurement information, which is determined by measurement of the performance by the terminal 310 and the performance measurement server 330, may include utilization of network resources, upload speed, download speed, response time, latency, or the like.

The quality assessment server 340 collects basic performance measurement information and the performance measurement information, and may provide, on the basis of the collected information, the terminal 310 with wireless LAN quality information, modification setting information (or recommendation setting information), and the like. Here, the basic performance measurement information is information indicating the condition or environment in which measurement of the performance is performed.

For example, the quality assessment server 340 may statistically compare, on the basis of the same basic performance measurement information, previously collected performance measurement information with newly collected performance measurement information. On the basis of the result of the comparison, the quality assessment server 340 may determine statistical quality grades and modification setting (or recommendation setting) of the wireless LAN. The quality assessment server 340 may transmit the determined quality grade and modification setting (or recommendation setting) to the terminal 310. The terminal 310 automatically (namely, without intervention or manipulation of the user) modifies the setting according to the modification setting information (or recommendation setting information), or provides modifiable setting (or recommended setting) to the user via a user interface (for example, a display, a sound player, and the like) so that the user of the terminal 310 is able to recognize the setting.

The DB 350 may store the performance measurement information, and the like provided from the terminal 310 or the performance measurement server 330, may store the basic performance measurement information, and the like collected by the quality assessment server 340, may store the wireless LAN quality information, and the like provided by the quality assessment server 340, and may store the modification setting information (or recommendation setting information), and the like determined on the basis of the quality information, and the like. The DB 350 which stores information may be updated with new information, or new information may be added while the previously stored information remains. Also, the DB 350 may provide the stored information to other entities, such as the quality assessment server 340, and the like.

Hereinafter, specific embodiments of the present invention in which managing the quality of the wireless LAN is performed in the system 300 for managing the quality of the wireless LAN will be described. First, in the embodiments of the present invention, information transmitted/received or used between entities within the system 300 for managing the quality of the wireless LAN will be described.

The basic performance measurement information may include at least one among terminal configuration information, terminal nearby environment information, and network setting information.

The terminal configuration information may include at least one among a hardware version of the terminal, an operation system (OS) version of the terminal, wireless LAN chip set information of the terminal, the number of antennas of the terminal, which are capable of performing simultaneous transmission and reception (namely, MIMO performance), a usable frequency band (for example, 2.4 GHz or 5 GHz) of the terminal, and a wireless LAN standard (for example, IEEE 802.11 a/b/g/n/ac) that supports the terminal. In addition thereto, the terminal configuration information may further include information on a terminal manufacturer, a model name, a model number, a serial number, a device name, a device type, and the like.

The terminal nearby environment information may include at least one among information on channel usage (for example, a channel occupancy ratio on a per-time basis, and the like) of the wireless LAN network that the terminal accesses, the strength of the received signal, the strength of interference, the number of neighboring APs (or BSSs), and setting information of the neighboring AP (or BSS) (namely, the network setting information on the neighboring AP, which will be described later).

The network setting information is for the AP (or BSS) that the terminal accesses, and may include at least one among identification information (for example, BSSID, SSID, and the like) of the AP (or BSS) that the terminal accesses, an operation channel of the AC that the terminal accesses, information on whether or not channel bonding takes place, the position of a primary channel, a usable frequency band, a wireless LAN access mode, the number of antennas of the AP that the terminal accesses, which are capable of performing simultaneous transmission and reception (namely, MIMO performance), a usable frequency band of the AP that the terminal accesses, and a wireless LAN standard (for example, IEEE 802.11 a/b/g/n/ac) that supports the AC which the terminal accesses.

The quality assessment server 340 may receive the performance measurement information of the terminal from the terminal 310, the performance measurement server 330, or the DB 350. In addition thereto, the quality assessment server 340 may receive the basic performance measurement information (for example, the terminal configuration information, the terminal nearby environment information, the network setting information) from the terminal 310 or the DB 350.

The quality assessment server 340 may link or map the performance measurement information and the basic performance measurement information. That is, the quality assessment server 340 may map at least one among the terminal configuration information, the terminal nearby environment information, and the network setting information with the performance measurement information of the terminal. For example, when a terminal of a certain configuration to which a certain network setting is applied is in a certain surrounding environment, the performance measurement information has a certain value, and the links or maps therebetween may be stored in the DB 350.

Accordingly, the quality assessment server 340 may analyze or classify the performance measurement information according to the predetermined basic performance measurement information. As a result, the quality assessment server 340 may process the performance measurement information classified according to a predetermined reference (for example, the terminal configuration, the terminal surrounding environment, and the network setting) so as to generate the quality assessment information. The generated quality assessment information may be provided to the DB 350 or the terminal 310.

In addition to the quality assessment information, the quality assessment server 340 may generate the modification setting information of the terminal, in which the terminal 310 is able to obtain a higher quality assessment than with the current configuration, network setting, and surrounding environment. The modification setting information may be also referred to as the recommendation setting information for the terminal. The generated modification setting information may be provided to the terminal 310.

Figure 4:
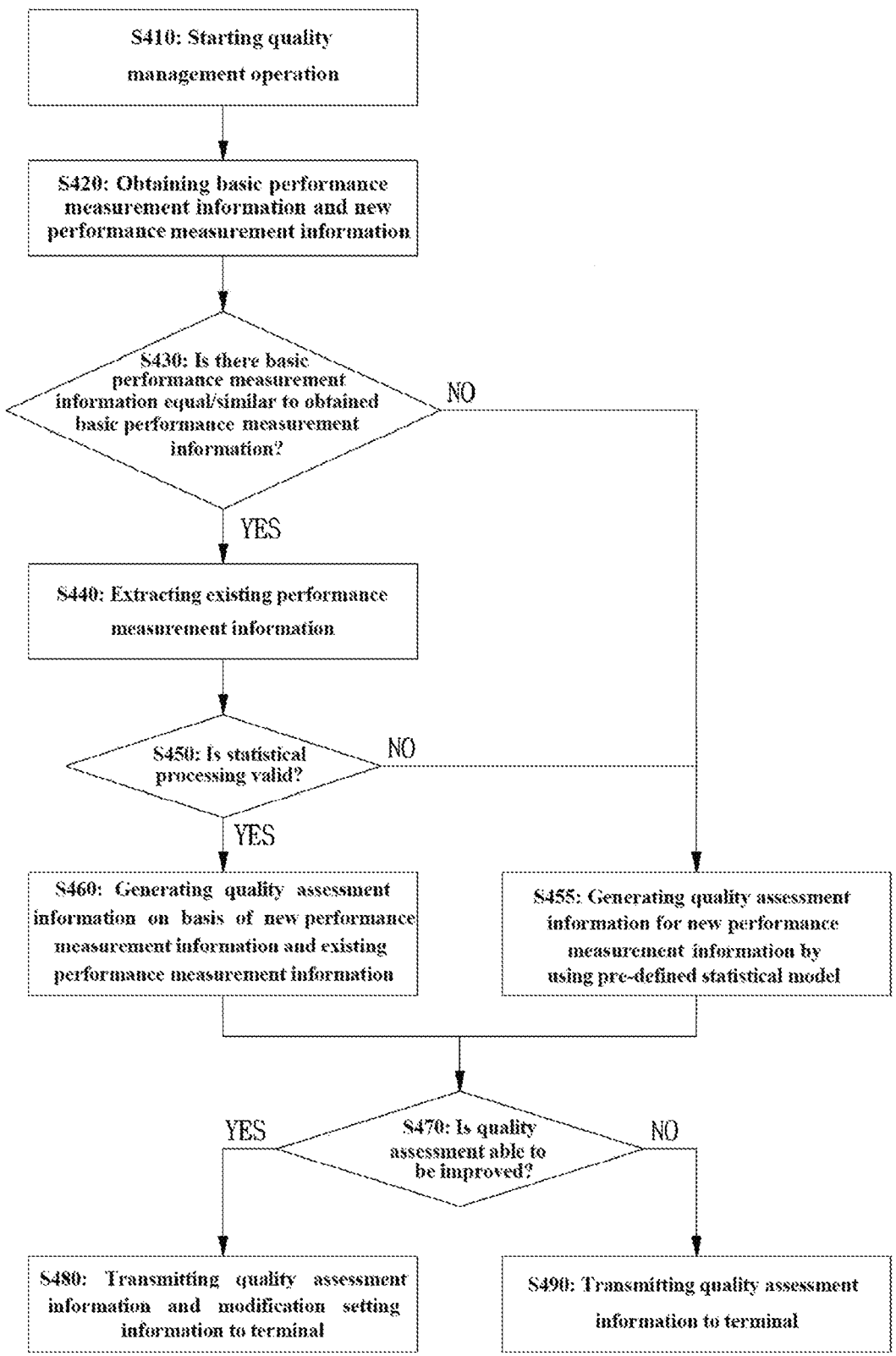
FIG. 4 is a flowchart illustrating a method of managing the quality according to an embodiment of the present invention.

FIG. 4 is a flowchart illustrating a method of managing the quality according to an embodiment of the present invention.

The method of managing the quality in FIG. 4 is performed by the quality assessment server 340. The method may include an operation by the quality assessment server 340 to transmit and receive signals or data from other entities (for example, the terminal 310, the AP 320, the performance measurement server 330, and the DB 350 in the example shown in FIG. 3 or other entities not shown in FIG. 3) within the system 300 for managing the quality of the wireless LAN, may include an operation process within the quality assessment server 340, and the like.

Also, the operation of managing the quality may include: an operation of assessing the quality of the wireless LAN, to which the terminal 310 belongs, by interaction of the entities within the system 300 for managing the quality of the wireless LAN; and an operation of providing the setting information or the control information for improving or adjusting the quality of the wireless LAN, to which the terminal 310 belongs, on the basis of the result of quality assessment (namely, quality assessment information).

The quality management operation start step at step S410 may be triggered by that the quality assessment server 340 receives a quality assessment request from the terminal 310 automatically according to a predetermined period set in the quality assessment server 340, or when an event, such as a manipulation by the manager of the quality assessment server 340 occurs.

At step S420, the quality assessment server 340 may obtain the basic performance measurement information (for example, the terminal configuration information, the terminal nearby environment information, and the network setting information) from the terminal 310 or the DB 350, and in addition thereto, may obtain new performance measurement information (or first performance measurement information) from the terminal 310, the performance measurement server 330, or the DB 350.

At step S430, the quality assessment server 340 may determine whether the basic performance measurement information corresponding to the basic performance measurement information obtained at step S420 (namely, that is the same or similar to the basic performance measurement information obtained at step S420) is present in the DB 350 (for example, searching the DB 350).

When it is found that basic performance measurement information of which values are the same as values of all elements (for example, all elements indicating the terminal configuration, the terminal surrounding environment, and the network setting) constituting the basic performance measurement information obtained at step S420 is stored in the DB 350, the quality assessment server 340 determines that the basic performance measurement information identical to the basic performance measurement information obtained at step S420 is stored in the DB 350, and proceeding to step S440 takes place.

In the meantime, when the basic performance measurement information of which the values are the same as the values of the all elements constituting the basic performance measurement information obtained at step S420 is not stored in the DB 350, the quality assessment server 340 may search the DB 350 for whether the basic performance measurement information which is similar to the basic performance measurement information obtained at step S420 is stored or not.

For example, the basic performance measurement information obtained at step S420 is referred to as first basic performance measurement information, and the basic performance measurement information that is a target compared therewith is referred to as second basic performance measurement information. A criterion that the first basic performance measurement information is similar to the second basic performance measurement information may be defined as the case in which among the total number of all elements constituting the basic performance measurement information, the first basic performance measurement information and the second basic performance measurement information are compared with each other in an element-to-element manner, the number of matched elements accounts for N percent or more of the total number. Here, the value of N is, for example, 70, but without being limited thereto, the value may be set to an appropriate value by the manager of the quality assessment server 340.

Alternatively, the case in which the first basic performance measurement information is similar to the second basic performance measurement information may be defined as the case in which the categories of the elements constituting the basic performance measurement information are partially the same. For example, the first basic performance measurement information and the second basic performance measurement information are determined to be similar to each other when at least the elements corresponding to the categories of the terminal configuration information and the terminal nearby environment information are the same.

As described above, when determining that the basic performance measurement information which is the same or similar to the basic performance measurement information obtained at step S420 is stored in the DB 350, the quality assessment server 340 may proceed to step S440.

At step S440, when the basic performance measurement information that is the same or similar to the basic performance measurement information obtained at step S420 is stored in the DB 350, the quality assessment server 340 extracts the performance measurement information (namely, existing performance measurement information or the second performance measurement information) linked to the same or similar basic performance measurement information.

According to the embodiments of the present invention, the operation of managing the quality of the wireless LAN determines quality assessment and modification setting (or recommendation setting) which will be described later using the existing performance measurement information linked to the terminal 310 itself which is the target of the quality management as well as using the performance measurement information of another terminal (other terminals) having the same or similar configuration as the terminal 310, belonging to the same or similar surrounding environment, and having the same or similar network setting. Therefore, more accurate quality assessment is possible, and further, the effectiveness of the modification setting (or recommendation setting) for quality improvement is enhanced.

Also, the basic performance measurement information obtained at step S420 and the new performance measurement information may be stored in the DB 350 and may be utilized as the existing performance measurement information and the basic performance measurement information linked thereto in the quality assessment operation performed subsequently.

At step S450, the quality assessment server 340 may determine whether the new performance measurement information obtained at step S420 and the existing performance measurement information extracted at step S440 are valid for statistical processing.

Whether that is valid for statistical processing may be determined on the basis of the amount of the data including the new performance measurement information and the existing performance measurement information. For example, among the data stored in the DB 350, in the case where the number of items (for example, the number of history items) of the existing performance measurement information extracted at step S440 according to the result of the determination at step S430 is less than M (for example, M=10), even if statistical processing is performed on the basis of such data, the result is likely to be meaningless, so that it is determined to be invalid for statistical processing. Alternatively, when the number of items of the existing performance measurement information extracted at step S440 is equal to or greater than M, it is determined to be valid for statistical processing.

When it is determined to be valid for statistical processing at step S450, the quality assessment server 340 may generate the quality assessment information on the basis of the new performance measurement information and existing performance measurement information at step S460.

For example, the quality assessment information may be calculated as a percentage value assigned for the new performance measurement information on the basis of the existing performance measurement information. As a more specific example, in comparison with multiple performance measurement values for each of the elements (for example, utilization of network resources, upload speed, download speed, response time, latency, and the like) constituting the existing performance measurement information, a percentage value indicating the position of the value of the relevant element of the new performance measurement information may be determined. Also, a representative percentage value of the entire performance measurement information may be calculated as an average of percentage values for respective elements.

As a more specific example, with respect to the terminal and the AP in a pair having the terminal configuration information that is the same or similar to that of the terminal 310, which is the target for the quality assessment, and the AP 320 in a pair, the existing performance measurement information stored in the DB 350 is statistically normalized, and the normal distribution graph is obtained as the result thereof. On the graph, the quality assessment information may be expressed as a percentage value indicating the position (or the number of items of the existing performance measurement information which is present at the lower or higher level than the new performance measurement information) to which the value of the new performance measurement information corresponds. This calculation of the percentage value may be performed individually on each element of the performance measurement information, or may be performed as calculation of a value representing all elements of the performance measurement information.

Alternatively, the calculated percentage value as above is converted into a section grade value (for example, a first grade for the value equal to or greater than 90% and equal to or less than 100%, a second grade for the value equal to or greater than 80% and less than 90%, a third grade for the value equal to or greater than 70% and less than 80%, and so on), whereby the quality assessment information is expressed.

Referring back to step S430, the quality assessment server 340 proceeds to step S455, when it is determined that the basic performance measurement information which is the same or similar to the basic performance measurement information obtained at step S420 is not present in the DB 350.

Further, referring back to step S450, the quality assessment server 340 proceeds to step S455, when it is determined that the existing performance measurement information extracted at step S440 and the new performance measurement information obtained at step S420 are not valid for statistical processing.

At step S455, the quality assessment server 340 may generate the quality assessment information for the new performance measurement information obtained at step S420 using a pre-defined statistical model.

The pre-defined statistical model may be constructed with a set of performance measurement values theoretically derivable according to the basic performance measurement information (for example, the usable frequency band, a supported standard, the number of MIMO antennas, the terminal configuration information and the network setting information, such as information on whether or not channel bonding takes place, and the like). This statistical model may be determined by applying calculation or simulation according to pre-defined rules based on the basic performance measurement information obtained by the quality assessment server 340. Also, in the normal distribution graph of the statistical model consisting of the set of the performance measurement values as described above, the quality assessment information may be generated as a percentage value indicating the position of the new performance measurement information obtained by the quality assessment server 340.

Alternatively, the pre-defined statistical model may be constructed with a maximum performance measurement value theoretically derivable according to the basic performance measurement information (for example, the usable frequency band, the supported standard, the number of MIMO antennas, the terminal configuration information and the network setting information, such as information on whether or not channel bonding takes place, and the like). In this case, with respect to the value of the new performance measurement information obtained by the quality assessment server 340, a percentage value (for example, a percentage value obtained by multiplying 100 by a value of the result of dividing the download speed value of the new performance measurement information by a theoretical maximum speed value) based on the maximum performance measurement value is calculated, whereby the quality assessment information is generated.

Alternatively, the calculated percentage value as above is converted into a section grade value (for example, a first grade for the value equal to or greater than 90% and equal to or less than 100%, a second grade for the value equal to or greater than 80% and less than 90%, a third grade for the value equal to or greater than 70% and less than 80%, and so on), whereby the quality assessment information is expressed.

At step S470, the quality assessment server 340 may determine, on the basis of the generated quality assessment information, whether it is possible to improve the assessment of the quality of the wireless LAN.

In order to improve the assessment of the quality of the terminal 310, modifying the setting of the terminal 310 or modifying the setting of the AP 320 may be considered. Here, the modifiable setting information may include terminal setting information and AP setting information. The terminal setting information may include information on an operation channel of the terminal, enabling/disabling channel bonding of the terminal, modification of the operation frequency band (for example, 2.4 GHz or 5 GHz) of the terminal, modification of the AP which the terminal accesses (or is associated with) and the like. The AP setting information may include information on modification of the band in the case of a dual-band AP (namely, the AP supporting both 2.4 GHz and 5 GHz), modification in the operation channel of the AP, enabling/disabling channel bonding of the AP, and the like.

The quality assessment server 340 may calculate expected quality assessment information when at least one among the terminal setting information and the AP setting information as described above is modified. Here, calculation of the quality assessment information may use the statistical model as described above or may be based on the existing performance measurement information stored in the DB 350.

When the expected quality assessment information has a higher percentage value or higher grade than current quality assessment information, the quality assessment server 340 determines that it is able to improve the assessment of the quality of the wireless LAN. Otherwise, it is determined that it is unnecessary or unable to improve the assessment of the quality of the wireless LAN.

Alternatively, the quality assessment server 340 determines that there is room to improve the assessment of the quality when the quality assessment information indicates less than a predetermined threshold value P at a percentile (for example, P=90%), and proceeds to step S480. Alternatively, the quality assessment server 340 determines that improvement in the assessment of the quality is unnecessary when the quality assessment information indicates the result of the assessment at a high level that is equal to or greater than the predetermined threshold value P at a percentile, and proceeds to step S490.

Alternatively, even though the quality assessment information indicates less than the predetermined threshold value P at a percentile, even though modification of the terminal setting or the surrounding environment setting is impossible, or even though modification of the terminal setting or the surrounding environment setting takes place, when the quality assessment server 340 determines that the improvement in the assessment of the quality is impossible, proceeding to step S490 takes place.

At step S480, the quality assessment server 340 may transmit the quality assessment information generated at step S460 and the modification setting information (or recommendation setting information) to the terminal 310.

For example, the quality assessment server 340 may compare, on the basis of the current use channel state of the terminal 310 and the AP 320 (for example, the usable frequency width, a use center frequency, information on whether or not channel bonding takes place, and the like) and information on the nearby APs (for example, the number of APs using channels overlapping with the operation channel of the AP 320, and the number of APs using channels adjacent to or overlapping with the lower frequency side or higher frequency side with respect to the center frequency of the operation channel of the AP 320), the existing performance measurement information stored in the DB 350 with the new performance measurement information. As the result of the comparison, what upper percentage the new performance measurement information accounts for, of existing performance measurement information is determined. When the percentage value (namely, the value of the quality assessment information) does not reach a predetermined target value, the quality assessment server 340 takes into consideration modification of the terminal setting information or the AP setting information. For example, the quality assessment server 340 assumes the setting information that the channel currently used by the terminal 310 and the AP 320 is shifted by one channel in the high frequency direction, searches for the existing performance measurement information in the case where this assumption is applied, and derives the expected quality assessment information of the assumed performance measurement information on the basis of the found existing performance measurement information. The quality assessment server 340 derives the expected quality assessment information as described above by changing the assumption about the operation channel, and determines the setting information (namely, the terminal setting information or AP setting information) corresponding to the assumption with the highest quality or the quality of the predetermined target value or more among the expected quality assessment information according to various assumptions.

The quality assessment server 340 may provide the current quality assessment information determined as described above and the modification setting information (or recommendation setting information) indicating improvable setting information to the terminal 310.

In the meantime, at step S490, the quality assessment server 340 may transmit the quality assessment information generated at step S460 to the terminal 310.

According to the various embodiments of the present invention described above, rather than simply informing the user of the terminal 310 about the performance measurement information (for example, download speed, upload speed, latency, and the like), the quality assessment information of the wireless LAN that the terminal 310 accesses currently is provided to the terminal 310 or the user of the terminal 310, and further, the modification setting information (or recommendation setting information), which is able to improve the current assessment of the quality, is provided to the terminal 310 or the user of the terminal 310 in such a manner as to induce improvement of the quality of the wireless LAN.

The quality assessment server 340 as described above may be configured as the network apparatus 200 shown in FIG. 1.

For example, the quality assessment server 340 may be realized as the network apparatus 200, which manages the quality of the wireless LAN, and may include the processor 210, the antenna unit 220, the transceiver 230, the memory 240, and the like. The processor 210 may be set in such a manner as to: obtain the basic performance measurement information for the terminal apparatus 100 that accesses the wireless LAN and first performance measurement information via the transceiver 230; determine the second performance measurement information to be compared with the first performance measurement information using the basic performance measurement information; generate the quality assessment information for the first performance measurement information on the basis of the first performance measurement information and the second performance measurement information; and transmit the quality assessment information to the terminal apparatus 100 via the transceiver.

As a further example, the quality assessment server 340 may be realized as the network apparatus 200, which assesses the quality of the wireless LAN, and may include the processor 210, the antenna unit 220, the transceiver 230, the memory 240, and the like. The processor 210 may be set in such a manner as to: obtain the first basic performance measurement information and the first performance measurement information via the transceiver 230; and link the first basic performance measurement information and the first performance measurement information for storage in the memory 240. Also, the processor 210 may be set in such a manner as to: obtain the second basic performance measurement information and the second performance measurement information via the transceiver 230; and link the second basic performance measurement information and the second performance measurement information for storage in the memory 240. Further, the processor 210 may be set in such a manner as to: compare the first performance measurement information and the second performance measurement information; and generate the quality assessment information with respect to the terminal that accesses the wireless LAN.

The matters described in the various embodiments of the present invention may be applied independently, or two or more embodiments may be simultaneously applied.

Although the exemplary methods described in the various embodiments of the present invention are expressed as a series of operations for clarity of description, the order of the steps is not limited thereto. When necessary, the steps may be performed simultaneously or in a different order. Further, not all exemplary steps are necessary to realize the method proposed in the present invention.

The scope of the present invention includes the apparatus for processing or realizing operation according to the method proposed in the present invention.

The scope of the present invention includes software (or an operating system, an application, firmware, a program, or the like) that cause operation according to the method proposed in the present invention to be performed on a device or a computer, and includes a medium storing such software, or the like to execute on a device or a computer.

The invention claimed is:

1. A method of managing quality of channel, the method comprising:
obtaining basic performance measurement information on a terminal that accesses the wireless LAN (Local Area Network);
obtaining first performance measurement information;
determining second performance measurement information based on the obtained basic performance measurement information, wherein when the obtained basic performance measurement information is present in existing basic performance measurement information stored in a database, the second performance measurement information linked to the obtained basic performance measurement information is obtained from the database, wherein when the obtained basic performance measurement information is not present in the existing basic performance measurement information stored in the database, the second performance measurement information is determined based on a pre-defined statistical model;
generating quality of channel assessment information for the first performance measurement information based on the first performance measurement information and the second performance measurement information, wherein the determined second performance measurement information is compared with the first performance measurement information when the quality of channel assessment information is generated; and
transmitting the quality of channel assessment information to the terminal.

2. The method of claim 1, wherein when the obtained basic performance measurement information is not present in the existing basic performance measurement information stored in the database, the quality of channel assessment information for the first performance measurement information is generated based on the first performance measurement information and the second performance measurement information determined based on the pre-defined statistical model.

3. The method of claim 1, wherein the generating of the quality of channel assessment information comprises:
determining whether to apply statistical processing for the second performance measurement information obtained from the database.

4. The method of claim 3, wherein the determining of whether to apply the statistical processing includes:
based on a number of items of the second performance measurement information obtained from the database being less than a predetermined threshold value, determining not to apply the statistical processing; and
based on the number of items of the second performance measurement information obtained from the database being equal to or greater than the predetermined threshold value, determining to apply the statistical processing.

5. The method of claim 4, wherein when determining that the statistical processing for the second performance measurement information obtained from the database is applied, the quality of channel assessment information for the first performance measurement information is generated based on the first performance measurement information and the second performance measurement information obtained from the database.

6. The method of claim 4, wherein when determining that the statistical processing for the second performance measurement information obtained from the database is not applied, the quality of channel assessment information for the first performance measurement information is generated based on the first performance measurement information and the second performance measurement information generated using a pre-defined statistical model.

7. The method of claim 1, wherein the quality of channel assessment information is transmitted with modification setting information generated based on the quality assessment information to the terminal.

8. The method of claim 1, further comprising:
storing the obtained basic performance measurement information and the first performance measurement information.

9. An apparatus for managing quality of a channel, the apparatus comprising:
a processor;
a transceiver; and
a memory, wherein the processor is configured to:
obtain basic performance measurement information on a terminal that accesses the wireless LAN (Local Area Network);
obtain first performance measurement information via the transceiver;
determine second performance measurement information based on the obtained basic performance measurement information;
wherein when the obtained basic performance measurement information is present in existing basic performance measurement information stored in a database, the second performance measurement information linked to the obtained basic performance measurement information is obtained from the database;
wherein when the obtained basic performance measurement information is not present in the existing basic performance measurement information stored in the database, the second performance measurement information is determined based on a predefined statistical model;

generate quality of channel assessment information for the first performance measurement information on the basis of the first performance measurement information and the second performance measurement information, wherein the determined second performance measurement information is compared with the first performance measurement information when the quality of channel assessment information is generated; and transmit the quality of channel assessment information to the terminal via the transceiver.

* * * * *